US007171398B2

(12) United States Patent
Bestgen et al.

(10) Patent No.: US 7,171,398 B2
(45) Date of Patent: Jan. 30, 2007

(54) OUTER AND EXCEPTION JOIN TO INNER JOIN NORMALIZATION

(75) Inventors: Robert Joseph Bestgen, Dodge Center, MN (US); John David Dietel, Rochester, MN (US); Robert Victor Downer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 10/687,286

(22) Filed: Oct. 16, 2003

(65) Prior Publication Data

US 2005/0086208 A1    Apr. 21, 2005

(51) Int. Cl.
*G06F 17/30* (2006.01)
(52) U.S. Cl. ......................................................... 707/2
(58) Field of Classification Search ................ 707/2–6, 707/100
See application file for complete search history.

(56) References Cited

U.S. PATENT DOCUMENTS

| 5,659,725 | A | 8/1997 | Levy et al. .................... 707/3 |
| 5,694,591 | A | 12/1997 | Du et al. ....................... 707/2 |
| 5,999,192 | A | 12/1999 | Selfridge et al. ........... 345/440 |
| 6,021,405 | A | 2/2000 | Celis et al. .................... 707/2 |
| 6,088,524 | A | 7/2000 | Levy et al. .................... 707/3 |
| 6,122,644 | A | 9/2000 | Graefe et al. ............... 707/202 |
| 6,138,111 | A | 10/2000 | Krishna .......................... 707/2 |
| 6,748,392 | B1* | 6/2004 | Galindo-Legaria et al. . 707/102 |
| 6,910,032 | B2* | 6/2005 | Carlson et al. ................ 707/3 |
| 6,915,291 | B2* | 7/2005 | Carlson et al. ................ 707/2 |
| 6,999,958 | B2* | 2/2006 | Carlson et al. ................ 707/3 |
| 2003/0229627 | A1* | 12/2003 | Carlson et al. ................ 707/3 |
| 2003/0229639 | A1* | 12/2003 | Carlson et al. ............. 707/100 |
| 2003/0229640 | A1* | 12/2003 | Carlson et al. ............. 707/100 |
| 2004/0015489 | A1* | 1/2004 | Anonsen et al. ............... 707/3 |
| 2004/0205078 | A1* | 10/2004 | Galindo-Legaria et al. . 707/100 |

OTHER PUBLICATIONS

U.S. Appl. No. 10/014,996, "Database Query Optimization Apparatus and Method that Represents Queries as Graphs", Robert J. Bestgen et al., filed Dec. 11, 2001.

* cited by examiner

*Primary Examiner*—Greta Robinson
*Assistant Examiner*—Cheryl Lewis
(74) *Attorney, Agent, or Firm*—Wood, Herron & Evans, LLP (57) ABSTRACT

An apparatus, program product and method utilize a query optimizer that identifies Join types in a query plan that can be replaced to facilitate optimization of the plan. If the query plan is considered to have a tree-graph representation, then the optimizer locates Join nodes to be replaced and substitutes an Inner Join node and additional nodes that do not inhibit optimization strategies and algorithms. As a result, all Outer Joins, whether left or right, and all Exception Joins, whether left or right, can be removed from the query plan before performing optimizations such as predicate movement, GROUP BY movement, ORDER BY movement, and Join enumeration.

29 Claims, 10 Drawing Sheets

OUTER AND EXCEPTION JOIN TO INNER JOIN NORMALIZATION

FIELD OF THE INVENTION

The invention relates to database management systems, and in particular, to database query optimizers utilized in such systems.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

One area that has been a fertile area for academic and corporate research is that of improving the designs of the "query optimizers" utilized in many conventional database management systems. The primary task of a query optimizer is to choose the most efficient way to execute each database query, or request, passed to the database management system by a user. The output of an optimization process is typically referred to as an "execution plan," "access plan," or just "plan" and is frequently depicted as a tree graph. Such a plan typically incorporates (often in a proprietary form unique to each optimizer/DBMS) low-level information telling the database engine that ultimately handles a query precisely what steps to take (and in what order) to execute the query. Also typically associated with each generated plan is an optimizer's estimate of how long it will take to run the query using that plan.

An optimizer's job is often necessary and difficult because of the enormous number (i.e., "countably infinite" number) of possible query forms that can be generated in a database management system, e.g., due to factors such as the use of SQL queries with any number of relational tables made up of countless data columns of various types, the theoretically infinite number of methods of accessing the actual data records from each table referenced (e.g., using an index, a hash table, etc.), the possible combinations of those methods of access among all the tables referenced, etc. An optimizer is often permitted to rewrite a query (or portion of it) into any equivalent form, and since for any given query there are typically many equivalent forms, an optimizer has a countably infinite universe of extremely diverse possible solutions (plans) to consider. On the other hand, an optimizer is often required to use minimal system resources given the desirability for high throughput. As such, an optimizer often has only a limited amount of time to pare the search space of possible execution plans down to an optimal plan for a particular query.

Queries which the optimizer can handle often include Join operations of various types. For example, an Inner Join between the two tables will result in only the records matching certain selection criteria to be returned to a user. An outer join, such as a Left Join of Table A and Table B (according to a set of selection criteria) will return all matching records as well as those records in Table A not having a match in Table B. The matching records will have the values of all their fields populated by the data from Table A and Table B. However, the non-matching records from Table A will have a NULL, or other default value, in the fields from Table B. Another outer join, such as a Right Join of Table A and Table B will also return all the matching records but, unlike the Left Join, will return those records in Table B not having a matching record in Table A. Another join type is a Left Exception Join of Table A and Table B. In this instance, the result set will consist of those records in Table A for which no matching record in Table B exists. A Right Exception Join is available as well. Within the field of SQL queries, a number of different but synonymous terms are used. For purposes of simplicity, within the present description, a Left Join and Left Outer Join are equivalent terms and Right Join and Right Outer Join are equivalent terms also. Furthermore, an Inner Join and EquiJoin are equivalent terms as well.

The presence of an outer join, such as a Left Join or Right Join, or an Exception Join in a query plan can reduce the level of optimization achievable by the optimizer. Specifically, the presence of these undesirable join types prevents, or severely limits, the ability of the optimizer to perform predicate movement, ORDER BY movement, GROUP BY movement, and Join enumeration when developing an optimal query plan.

In partial recognition of this problem, previous optimizers have included a Join-Downgrade feature in which, under specific circumstances, an Outer Join or Exception Join is replaced with an Inner Join. These optimizations, however, do not address all occurrences of Outer and Exception Joins.

As described earlier, a Left Join of two tables selects records matching a particular selection criteria and any records in the first table that do not have a match in the second table. Accordingly, the Left Join can be considered to consist of an Inner Join with the selection criteria and an Exception Join of all the records in the first table except those also in the second table. In other words, a Left Join is the union of an Inner Join portion and an Exception Join portion.

In some instances, the logic of an SQL SELECT statement may exclude all the records that would be included by operation of the Exception Join portion. For example, the logic of the SELECT statement may, in addition to the Left Join, test some value from the second table against a non-NULL value. Those records which satisfy the Inner Join portion of the Left Join have appropriate values in their fields and may or may not pass the test; however, any records satisfying the Exception Join portion of the Left Join (i.e., those records in the first table that do not have a match in the second table) will have a NULL value and will fail the test. As a result, the selection criteria of the SELECT statement effectively removes all the records returned as part of the Exception Join portion of the Left Join.

Under these specific conditions, an optimizer can perform a Join-Downgrade to replace the Left Join with an Inner Join. There remains the need, however, for optimizers to implement a general solution to replace every Outer and Exception Join encountered while developing a query plan with a type of Join that facilitates optimization strategies such as predicate movement (up or down), ORDER BY movement, GROUP BY movement, and Join enumeration.

SUMMARY OF THE INVENTION

The embodiments discussed hereinafter utilize an optimizer framework to support the replacement of various Join types within a query plan with different Join types that permit easier optimization to be performed. In particular, the optimizer framework receives a query plan and can replace any occurrence of an Outer Join, whether Left or Right, and any occurrence of an Exception Join, whether Left or Right. These types of Joins are replaced with Join types, such as an Inner Join, which produce the same results as the original query plan but do not adversely impact other optimization strategies in a manner similar to Outer Joins and Exception Joins.

One aspect of the present invention relates to a method for creating at least a portion of a query plan for a Join between a first table and a second table. In accordance with this aspect, the query plan is created by generating an Inner Join, wherein the Inner Join joins the first table and a Fan-out node; and also generating a Fan-out node, wherein the Fan-out node accesses the second table according to a set of selection criteria.

One other aspect of the present invention relates to a method for optimizing a query plan. According to this method, an optimizer first identifies a parent node that is a Join node, wherein the parent node has an original right child node and an original left child node. Next, the optimizer changes the parent node to an Inner Join node and also substitutes a new node as a right child node of the Inner Join node. Additionally, the optimizer moves the original right child node to be a child node of the new node. Thereby effectively removing the parent node from the query plan.

Another aspect of the present invention relates to a computer-readable medium bearing instructions for optimizing a query plan. These instructions are arranged so that upon execution thereof, they cause one or more processors to perform the steps of: a) identifying a parent node that is a Join node, wherein the parent node has an original right child node and an original left child node; b) changing said parent node to an Inner Join node; c) substituting a new node as a right child node of the Inner Join node; and d) moving the original right child node to be a child node of the new node.

A further aspect of the present invention relates to an apparatus that includes at least one processor and a memory coupled with the at least one processor. According to this aspect, the apparatus also includes an optimizer residing in the memory and executed by the at least one processor, wherein the optimizer is configured to identify every Join node in a query plan that interferes with optimization and replace each such Join node with an Inner Join node and a new node.

DETAILED DESCRIPTION

As mentioned above, the embodiments discussed hereinafter utilize an optimizer framework to support the replacement of various Join types within a query plan with different Join types that permit easier optimization to be performed. A specific implementation of an optimizer framework capable of supporting this restructuring of query plans in a manner consistent with the invention will be discussed in greater detail below. However, prior to a discussion of such a specific implementation, a brief discussion will be provided regarding an exemplary hardware and software environment within which such an optimizer framework may reside.

Hardware/Software Environment

Figure 1:
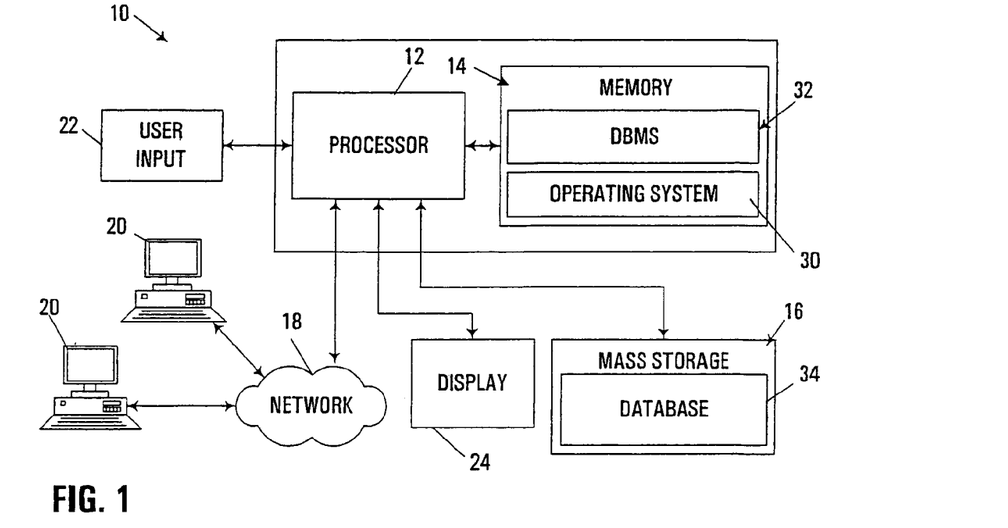
FIG. 1 is a block diagram of a networked computer system incorporating a database management system consistent with the invention.

Turning now to the Drawings, wherein like numbers denote like parts throughout the several views, FIG. 1 illustrates an exemplary hardware and software environment for an apparatus 10 suitable for implementing a database management system incorporating restructuring query plans consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

Figure 2:
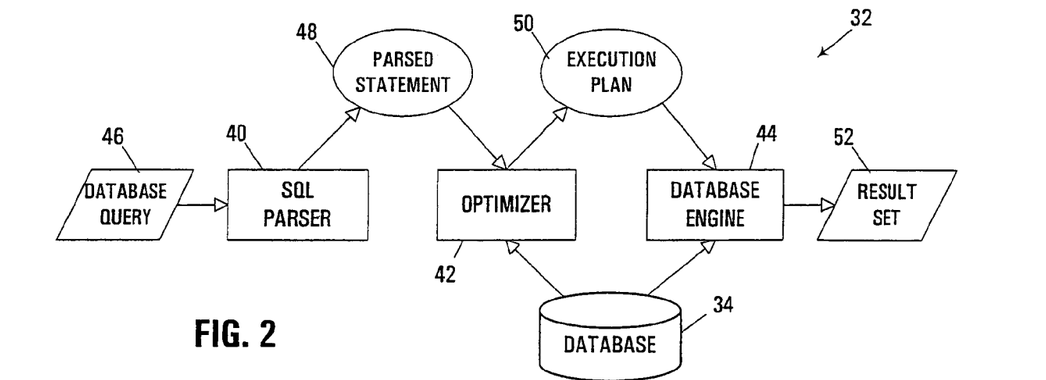
FIG. 2 is a block diagram illustrating the principal components and flow of information therebetween in the database management system of FIG. 1.

Turning briefly to FIG. 2, an exemplary implementation of database management system 32 is shown. The principal components of database management system 32 that are relevant to query optimization are an SQL parser 40, optimizer 42 and database engine 44. SQL parser 40 receives from a user a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated, often using data such as platform capabilities, query content information, etc., that is stored in database 34. Once generated, the execution plan is forwarded to database engine 44 for execution of the database query on the information in database 34. The result of the execution of the database query is typically stored in a result set, as represented at block 52.

Other components may be incorporated into system 32, as may other suitable database management architectures. Other database programming and organizational architectures may also be used consistent with the invention. Therefore, the invention is not limited to the particular implementation discussed herein.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Optimizer Method

Within the exemplary environment just described, the optimizer receives a query plan and analyzes it for optimization or generates a query plan in a multi-step process. As mentioned previously, some optimization strategies such as join enumeration, predicate movement, ORDER BY movement and GROUP BY movement are difficult to perform when various Join types are present in the query plan.

Figure 3:
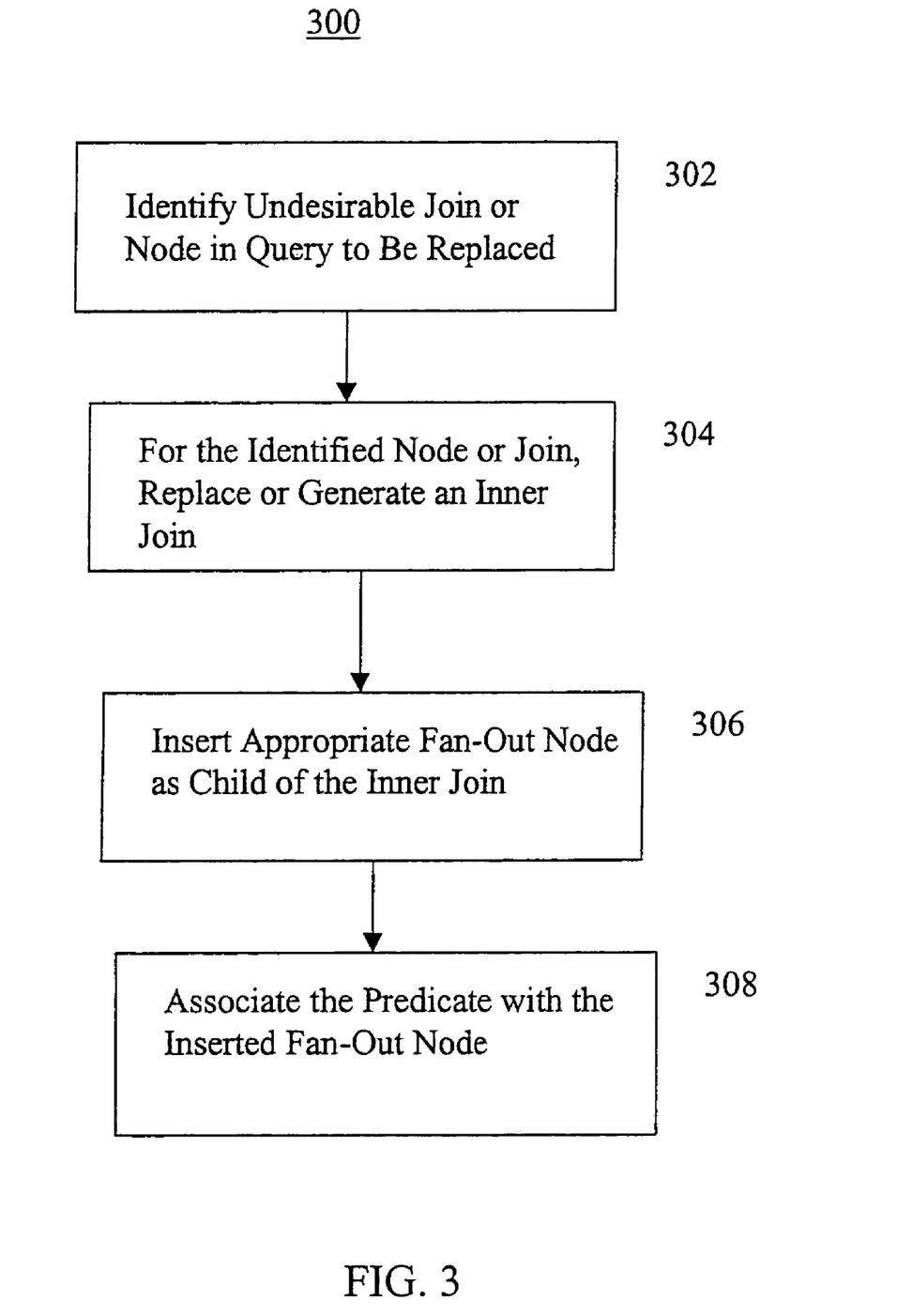
FIG. 3 depicts a flowchart for optimizing query plans according to exemplary embodiments of the present invention.

FIG. 3 depicts an exemplary general method 300 for an optimizer to replace undesirable nodes in a query plan which it receives for optimization. Specific examples of applying this method to particular Join types follow in conjunction with subsequent drawings. To aid in understanding common terminology used in a tree-graph representation, reference is made to FIG. 4 that depicts an exemplary conventional tree graph in which there is a parent Join node 402, two child nodes 404 and 406, and a set of predicates, or selection criteria, 408.

This method could be part of the optimizer application 42 or could be a loadable software module which the optimizer 42 could access during optimization. According to this method, the optimizer identifies, in step 302, an undesirable node such as a Left Join, Right Join, Left Exception Join, or Right Exception Join for replacement. Then, in step 304, the optimizer replaces that node with an Inner Join node. Next, in step 306, the optimizer inserts an appropriate Fan-out node as either the left child node or the right child node of the Inner Join node. This Fan-out node is either an Outer Join Fan-out node or an Exception Fan-out node depending on the original Join node type. For a Left Join or Left Exception Join the Fan-out node is inserted as the right child node of the Inner Join and for a Right Join or Right Exception Join, the Fan-out node is inserted as the left child node of the Inner Join.

Finally, in step 308, the optimizer moves the predicate (e.g., the ON clause) to be associated with the just-inserted Fan-out node.

Once the query plan is restructured in this manner, the optimizer can more easily perform additional optimization such as Join Enumeration, Predicate movement, Order By movement and Group By movement. Eventually, the query execution engine receives the optimized plan and the query is executed with the results being returned to the user.

Figure 5:
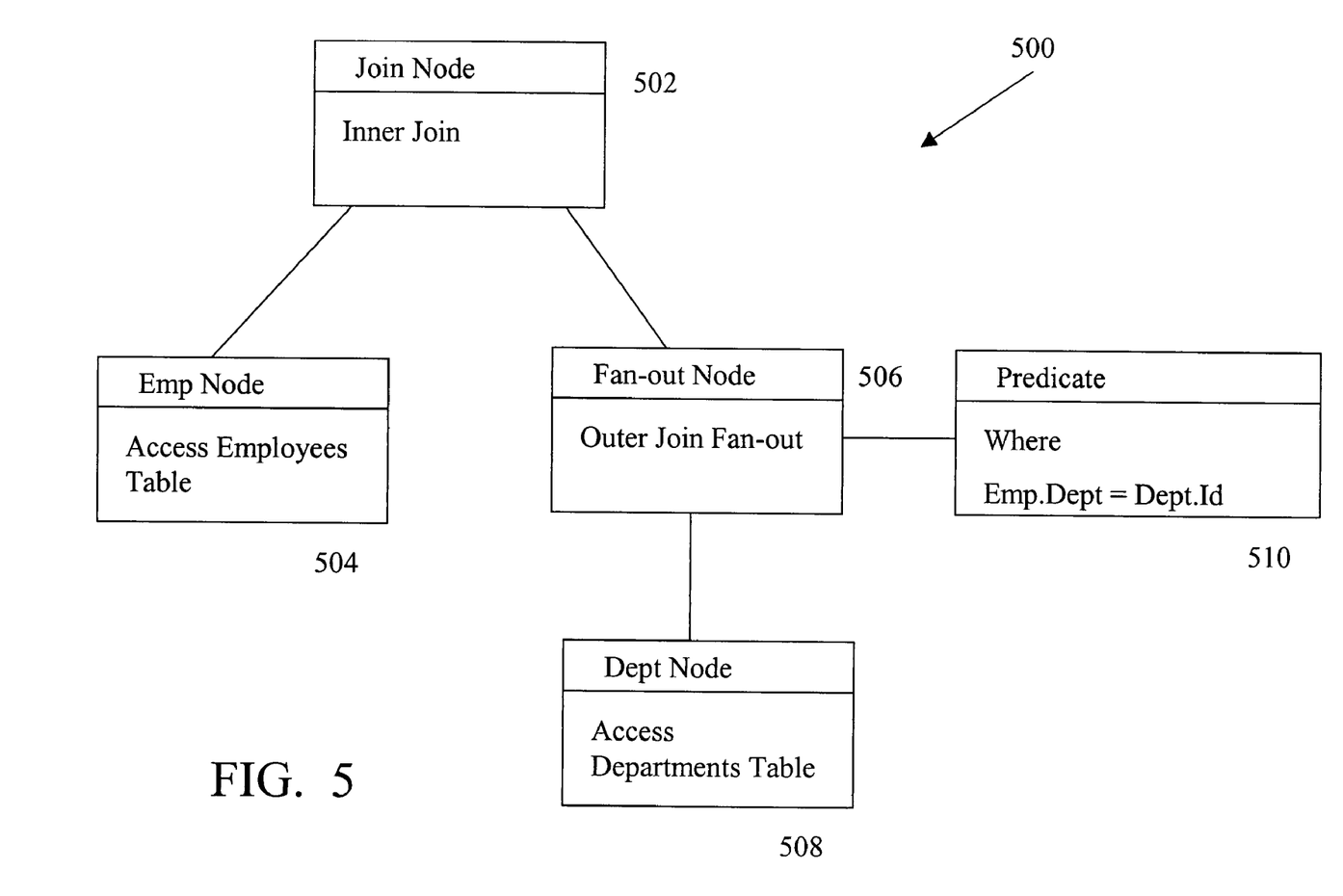
FIG. 5 illustrates a restructured tree-graph according to exemplary embodiments of the present invention that is functionally equivalent to a Left Join.

Within the above-described method, it was presumed that a query plan graph already existed having, for example, a Left Join node and is available to the optimizer. In alternative embodiments, the above described techniques for generating a query plan without certain Join types can be used not only to replace an undesirable Join node in an existing query plan but to generate the initial query plan tree graph itself. Thus, in operation, when the optimizer encounters a Left Join, or other undesirable join type, during plan generation, the optimizer can build the tree graph as shown in FIG. 5 without the intermediate step of explicitly creating a Left Join Node and then replacing it. Accordingly, when the optimizer encounters, for example, a Left Join of Table A and Table B, in the SQL statement then the optimizer can generate a parent Inner Join node with Table A as its left child node and a Fan-out node as its right child node. The Fan-out node will also have Table B as its child node. As a result, the query plan is initially generated without a Left Join node ever being created.

To aid in the understanding of the above general method 300, specific examples follow describing application of the method 300 to a Left Join, a Left Exception Join, a Right Join, and a Right Exception Join.

Left Join Normalization

One particularly problematic Join type for optimizers is an Outer Join, such as a Left Join. A Left Join (or a Right Join) consists of a join operation and a filter operation. The join portion creates the various combinations of the different records from both tables and then the filter portion identifies which of these different combinations satisfy a particular set of criteria.

Figure 4:
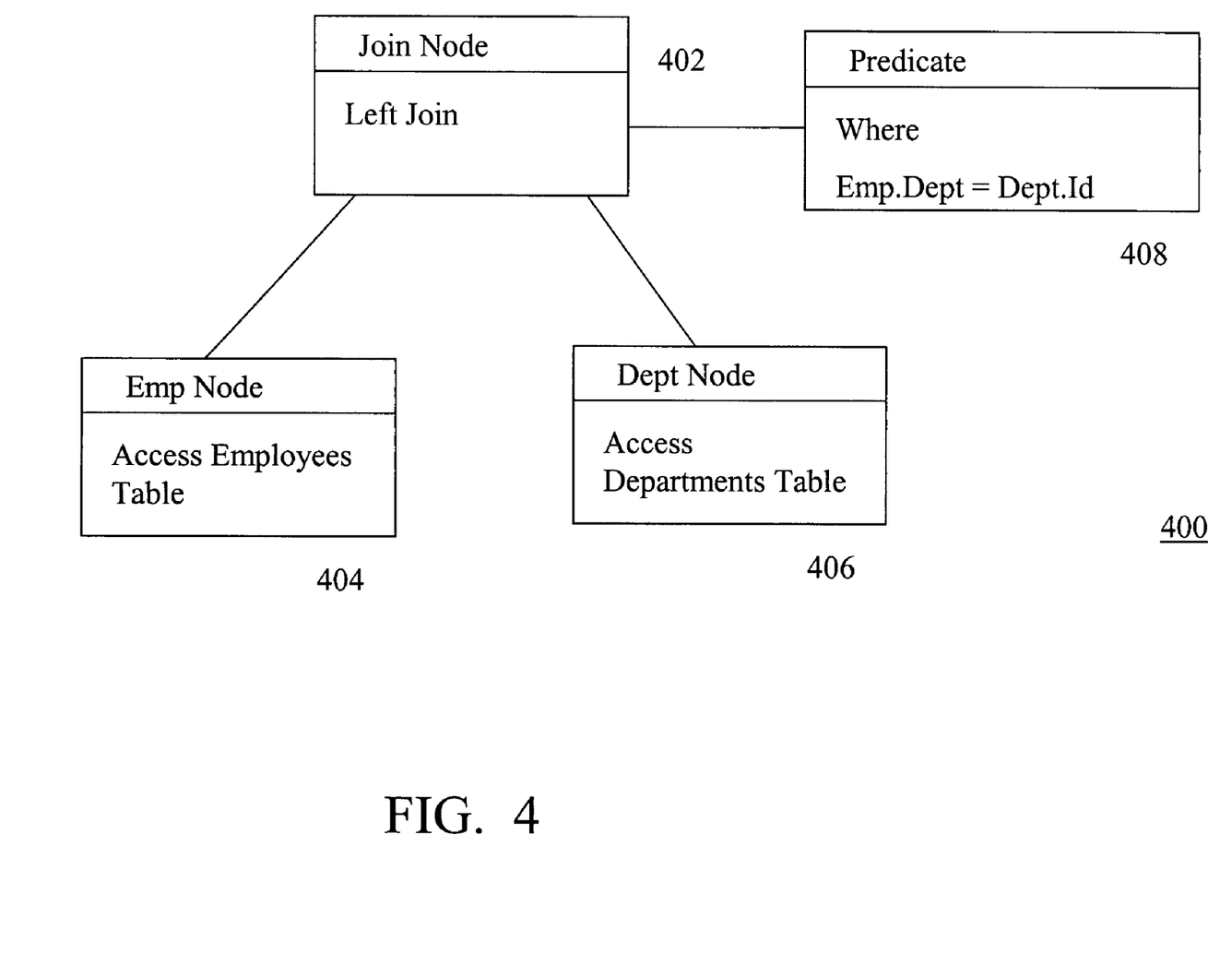
FIG. 4 illustrates a conventional tree-graph representation of a Left Join.

FIG. 4 is a tree-graph representation 400 of a query, particularly a query involving a Left Join. A query execution engine operates in the following manner whether the tree-graph 400 is a stand-alone query or part of a larger query. The Left Join node 402 retrieves an active record from the left child node 404 (e.g., Employees) and creates a Cartesian product with the records from the right child node 406 (e.g., Departments). In other words, an intermediate record is created for each record in the right child node 406 which is a combination of the active record and that particular record in the right child node 406. Then the Join logic is applied, such as ON criteria or other predicates 408. Any matching intermediate records are returned with the appropriate values from each table. However, if no matching intermediate records are found for the active record, then a record is returned with the fields of the right child node 406 set to NULL (or some other predetermined value).

This sequence is repeated by the Left Join node 402 for each of the records in the left child node 404. Eventually, a result set is returned that constitutes a Left Join operation.

Embodiments of the present invention provide a method and system for a query optimizer to replace any Left Join encountered during the optimization process. In addition, the optimizer can replace any Right Join and Exception Join as well even though operation is initially discussed below merely in relation to a Left Join. Removing these different Join types will facilitate other optimization efforts and provide better query performance.

FIG. 5 illustrates a tree graph of an alternative plan 500 to execute the Left Join query of FIG. 4 in accordance with embodiments of the present invention. In particular, the Left Join node 402 is replaced by an Inner Join node 502 and an Outer Join Fan-out node 506. The Fan-out node 506 includes logic which determines whether or not the Departments table 508, for example, has one or more matching records for a particular record from the Employees table 504. The criteria for what records are considered to match is determined by the predicate 510 that is now associated with the Fan-Out node 506.

In operation, the Inner Join node 502 retrieves an active record from the Employees table 504 and then accesses the Fan-out node 506 with knowledge of the values of this active record. The Fan-out node 506, in turn, initiates access of the Departments table 508 with this knowledge of this active record to see if the selection criteria defined by the predicates 510 are satisfied. If a matching record is found then it is returned to the Inner Join node 502 and becomes part of the result set. If no matching record is found, then the Fan-out node 506 recognizes this condition and generates a NULL record to be returned to the Inner Join node 502 for inclusion in the result set. This process repeats for all records in the Employees table 504 resulting in the same result set as the query plan of FIG. 4.

A specific example is provided below to help in the understanding of the operation of the Outer Join Fan-out node 506 but one of ordinary skill would readily recognize that different data, SQL statements and join criteria can easily be substituted within this example.

The following two tables include an Employees table and a Departments Table.

| Employees | | |
|---|---|---|
| Name | Phone | Dept |
| Rob | 555-2869 | 1 |
| Peter | 555-8608 | 1 |
| Toupee | 555-1142 | 2 |
| Paul | 555-3425 | — |

| Departments | | |
|---|---|---|
| Id | Name | Location |
| 1 | Sales | Rochester |
| 2 | Legal | Cincinnati |
| 3 | Ethics | Siberia |

A possible task may be to identify all employees and their work locations including employees that have not been assigned a department. An SQL query to accomplish this task might be:
SELECT Emp.Name, Dept. Location
FROM Employees Emp
LEFT OUTER JOIN Departments Dept
ON Emp.Dept=Dept.ID FIG. 4 shows a traditional query graph for performing this query while FIG. 5 depicts a query graph in which the Left Join has been replaced with an Inner Join 502 and an Outer Join Fan-out node 506.

In operation, the Join node 502 gets the first record from Emp node 504 which fetches the record for Rob and returns to the Join node 502. The Join node 502 then gets the first record from the Fan-out node 506 which, in turn, gets the first record from the Dept node 508 which fetches the record for the Sales department (i.e., the matching record) and returns to the Fan-out node 506. The Fan-out node 506 determines the predicate is satisfied and returns the retrieved record to the Inner Join node 502. The Join node 502 connects "Rob" and "Rochester" and returns this to the user.

The Join node 502 then gets the next record from the Fan-out node 506 which gets the next record from the Dept node 508. However, the Fan-out node 506 skips over the remaining records returned from the Dept node 508 because none of them match the ON criteria 510. The Fan-out node 506 knows that it returned at least one match for employee Rob so it does not generate any default, or NULL, records. The Fan-out node 506 returns to the Join node 502 indicating that no "next" record was found for "Rob".

The Join node 502 then gets the next record from the Emp node 504 which fetches the record for employee Peter and returns to the Join node 502. The Join node 502 then gets the first record from the Fan-out node 506 which, in turn, gets the first record from the Dept node 508 which fetches the record for the Sales department and returns to the Fan-out node 506 and then to the Join node 502. The Join node 502 connects "Peter" and "Rochester" and returns this to the user as part of a result set.

The Join node 502 then gets the next record from the Fan-out node 506 which gets the next record from the Dept node 508. However, the Fan-out node 506 skips over the remaining records returned from the Dept node 508 because none of them match the ON criteria 510. The Fan-out node 506 knows that it returned at least one match for employee Rob so it does not generate any default, or NULL, records. The Fan-out node 506 returns to the Join node 502 indicating that no "next" record was found for "Peter".

The Join node 502 then gets the next record from the Emp node 504 which fetches the record for employee Toupee and returns to the Join node 502. The Join node 502 then gets the first record from the Fan-out node 506 which, in turn, gets the first record from the Dept node 508 which is skipped over by the Fan-out node 506 because it does not match. The Dept node 508, however does fetch the record for the Legal department next and returns to the Fan-out node 506 and then to the Join node 502 as a match. The Join node 502 connects "Toupee" and "Cincinnati" and returns this to the user.

The Join node 502 then gets the next record from the Fan-out node 506 which gets the next record from the Dept node 508. However, the Fan-out node 506 skips over the remaining records returned from the Dept node 508 because none of them match the ON criteria 510. The Fan-out node 506 knows that it returned at least one match for employee Rob so it does not generate any default, or NULL, records. The Fan-out node 506 returns to the Join node 502 indicating that no "next" record was found for "Toupee".

The Join node 502 then gets the next record from the Emp node 504 which fetches the record for employee Paul and returns to the Join node 502. The Join node 502 then gets the first record from the Fan-out node 506 which, in turn, gets the first record from the Dept node 508. The Fan-out node 506 skips all the records because none of them match the selection criteria 510. The Fan-Out node 506 determines that for the record "Paul" that no matching record was found in the Dept node 508. Because the Fan-out node 506 recognizes that no matches were found for employee Paul, it constructs a NULL record that is returned to the Join Node 502. The Join node 502 connects "Paul" to NULL and returns this as part of the result set.

The Join node 502 then tries to get the next record from the Emp node 504 but is informed that no more records exist and execution of the query ends.

The result set returned by the query plan 500 is the same as if a traditional Left Join (e.g., FIG. 4) had been executed. However, the query plan of FIG. 5 does not include a Left Join which simplifies various conventional optimization algorithms.

Exception Join Normalization

In addition to replacing a Left Join, a similar restructuring of query plans can remove Exception Joins as well. For example, a Left Exception Join statement to find Employees without a valid department number might be written as:
SELECT*
FROM Employees Emp
LEFT EXCEPTION JOIN Departments Dept
ON Emp.Dept=Dept.Id.

Running this query on the two tables presented above would return only one record from Employees—that of "Paul".

Figure 6:
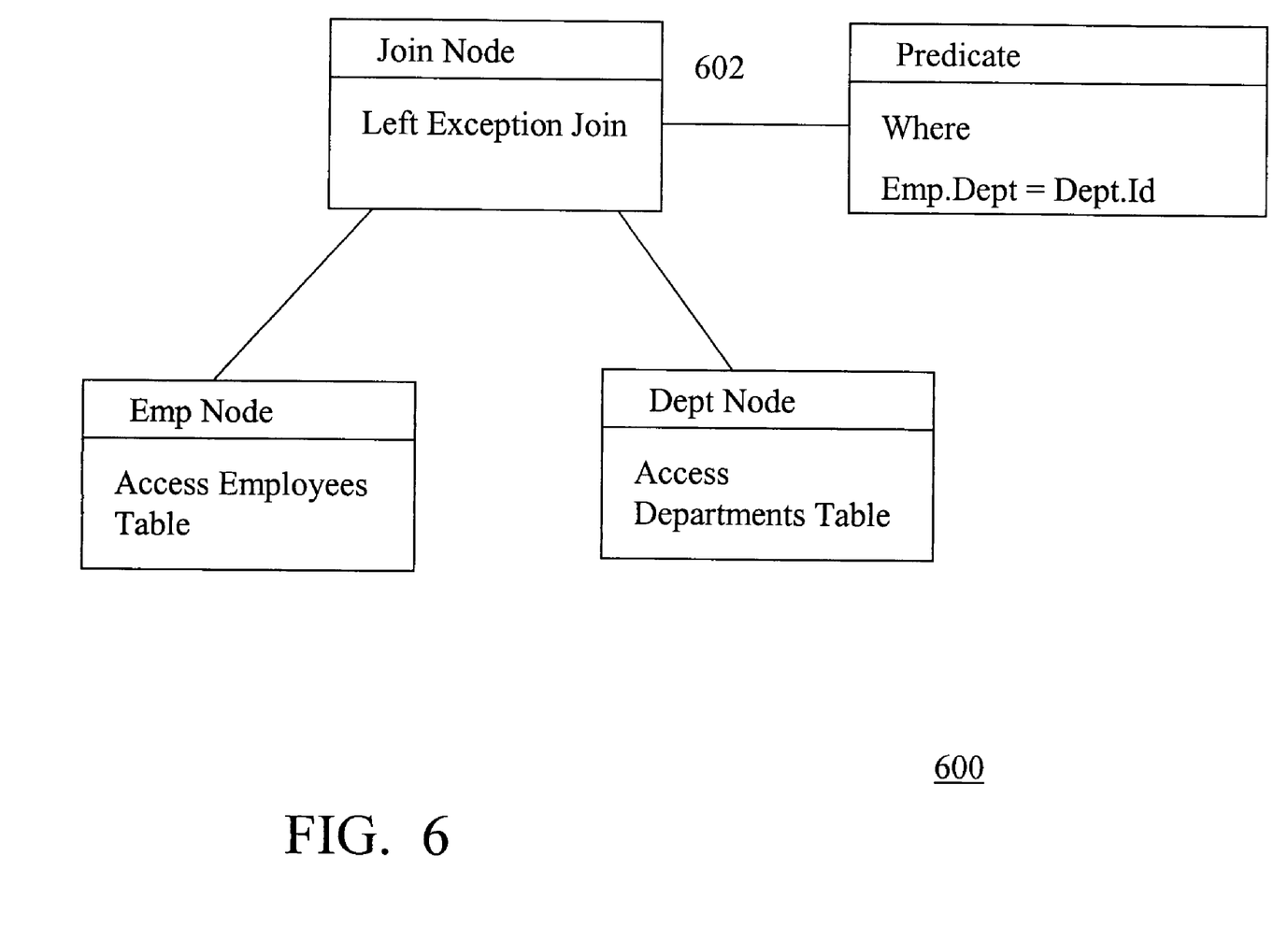
FIG. 6 illustrates a conventional tree-graph representation of a Left Exception Join.
Figure 7:
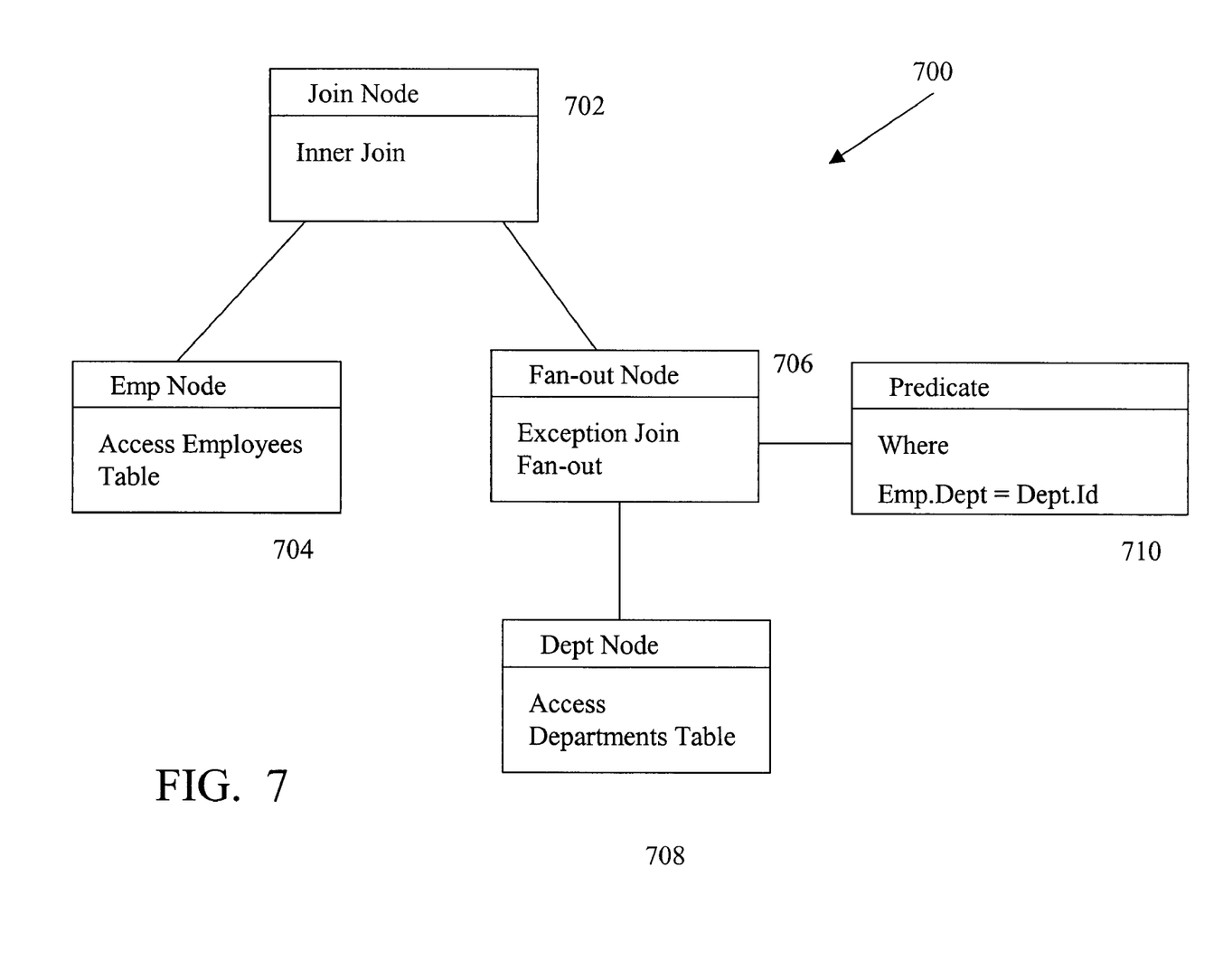
FIG. 7 illustrates a restructured tree-graph according to exemplary embodiments of the present invention that is functionally equivalent to a Left Exception Join.

A conventional tree graph might resemble that of graph 600 in FIG. 6 and can be restructured into a new graph 700 as shown in FIG. 7 by replacing the Left Exception Join 602 with an Inner Join 702 and an Exception Fan-out node 706. Additionally, the predicate 710 is moved so as to be associated with the inserted Fan-out node 706. This Fan-out node 706 is different from the Outer Join Fan-out node 506 described in relation to the Left Join of FIG. 5. In particular, this Exception Fan-out node 706 determines whether or not a matching record is found in the right child node 708 for each record from the left child node 704. If a match is found then no record is returned by the Fan-out node 706 to the Join node 702. However, if no match is found for a record from the left child node 704, then a default, or NULL, record is returned by the Fan-out node 706 to the Join node 702 for subsequent joining.

For example, in operation, the Join node 702 would fetch the record for Rob from the Emp node 704 and then search for matching records from the Fan-out node 706 which fetches records from the Dept node 708. Because this is an Exception Join, if a matching record is found in the Dept node 708 then no record is returned to the Join node 702 for inclusion in the result set. Instead, the Join node 702 retrieves the next record (for Peter) and continues. Finally, the Join node 702 fetches the record for Paul from the Emp node 704 and searches for matching records. During the search, the Fan-out node 706 determines according to the predicate criteria 710 that Dept node 708 has no matching records for Paul. Under these circumstances, the Fan-out node 706 generates a NULLL record to return to the Join node 702 which connects it with "Paul" for inclusion in the result set.

Right Join and Right Exception Join Normalization

A Left Join and a Left Exception join are considered to have "polarity". That is, they operate on tables in a particular order or direction such that a Left Join of table A with table B is unlikely to produce the same results as a Left Join of table B with table A. Accordingly, a Right Join and Right Exception Join also are commonly available that operate in an opposite manner as a Left Join and Left Exception Join. Because optimizers can replace Right Joins and Right Exception Joins with Left Joins and Left Exception Joins by moving the order of the applicable tables, such techniques could be used here followed by the above-described normalization in order to also remove Right Joins and Right Exception Joins from a query plan. In addition, however, embodiments of the present invention can directly eliminate a Right Join and Right Exception Join from a query plan without requiring table movement.

For example, the following SQL statement operating on the tables presented above
SELECT Emp.Name, Dept. Location
FROM Employees Emp
RIGHT OUTER JOIN Departments Dept
ON Emp.Dept=Dept.Id.
would produce the following result set:

| | |
|---|---|
| Rob | Rochester |
| Peter | Rochester |
| Toupee | Cincinnati |
| — | Siberia |

In other words, all matching records are provided as well as any record from the right table (e.g., Dept) for which no match exists in the left table (e.g., Emp).

Figure 8:
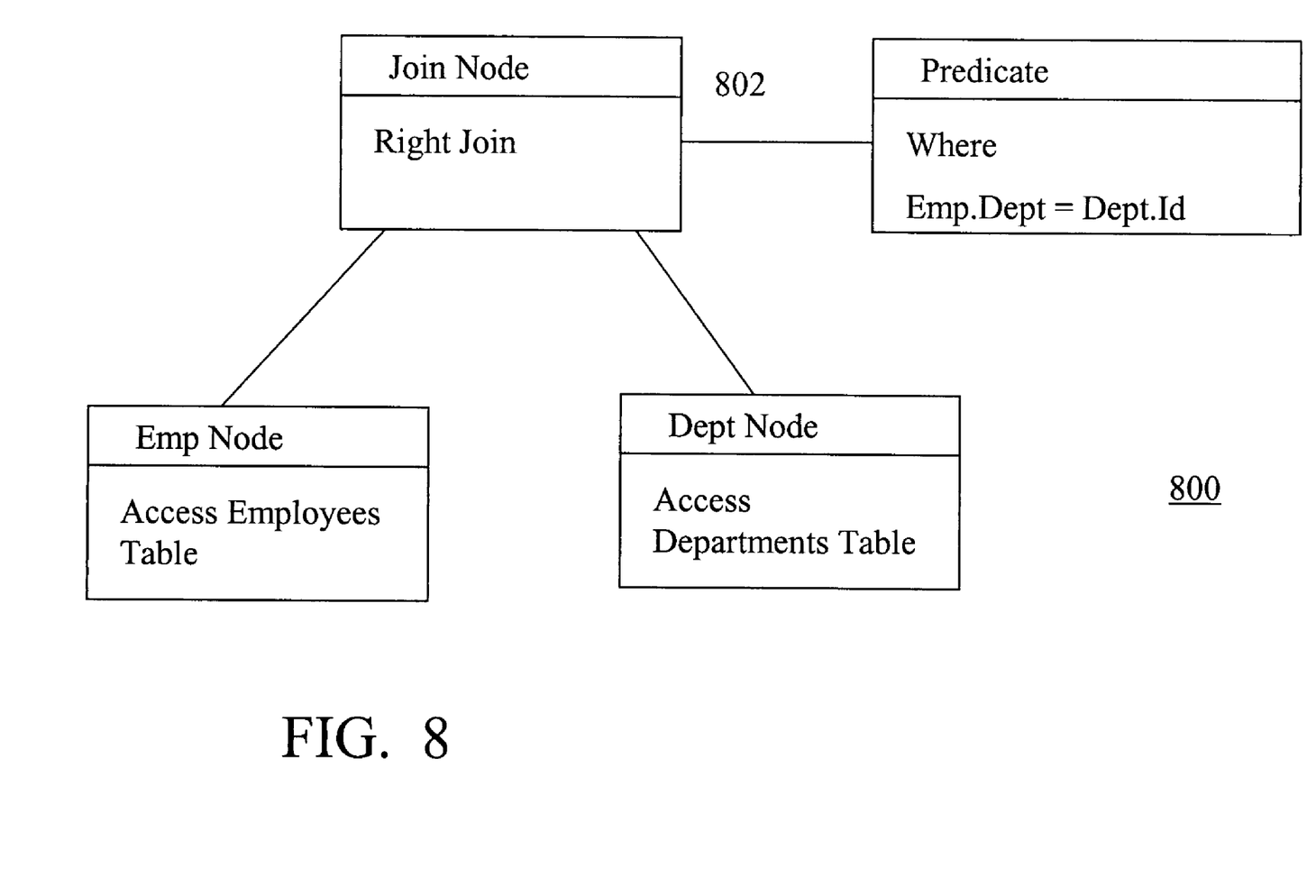
FIG. 8 illustrates a conventional tree-graph representation of a Right Join.
Figure 9:
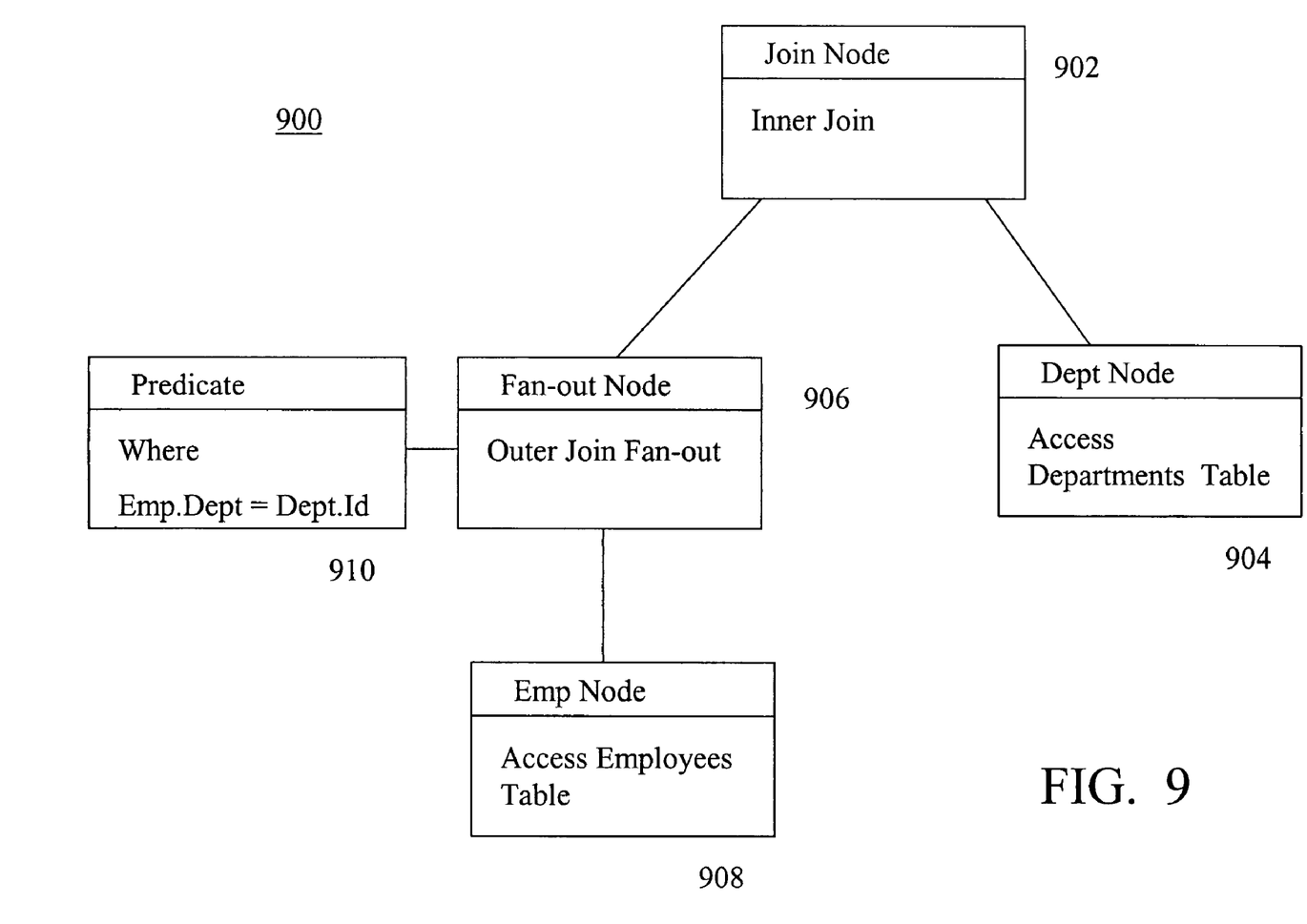
FIG. 9 illustrates a restructured tree-graph according to exemplary embodiments of the present invention that is functionally equivalent to a Right Join.

FIG. 8 illustrates a conventional query graph 800 for a Right Join and FIG. 9 illustrates a restructured query graph 900 in which the Right Join node 802 has been replaced with an Inner Join node 902 having as its left child node a Fan-out node 906. Additionally, the predicate 910 is now associated with the Fan-out node 906.

According to the query graph 900 of FIG. 9, the Inner Join node 902 gets the first record from the Dept node 904 and finds matching records through the Fan-out node 906. Unlike the Inner Join previously described, this Inner Join 902 is designed to first travel down to its right to the Dept node 904 and get a record and then to the left to the Fan-out node 906 to look for matching records. This Fan-out node 906 behaves the same as the Outer Join Fan-out node 506 described earlier. When a matching record is found, then it is returned to the Join node 902 for inclusion in the result set. However, when no matching record is found for a record from the right child node 904, then a NULL record is generated and returned to the Join node 902.

Figure 10:
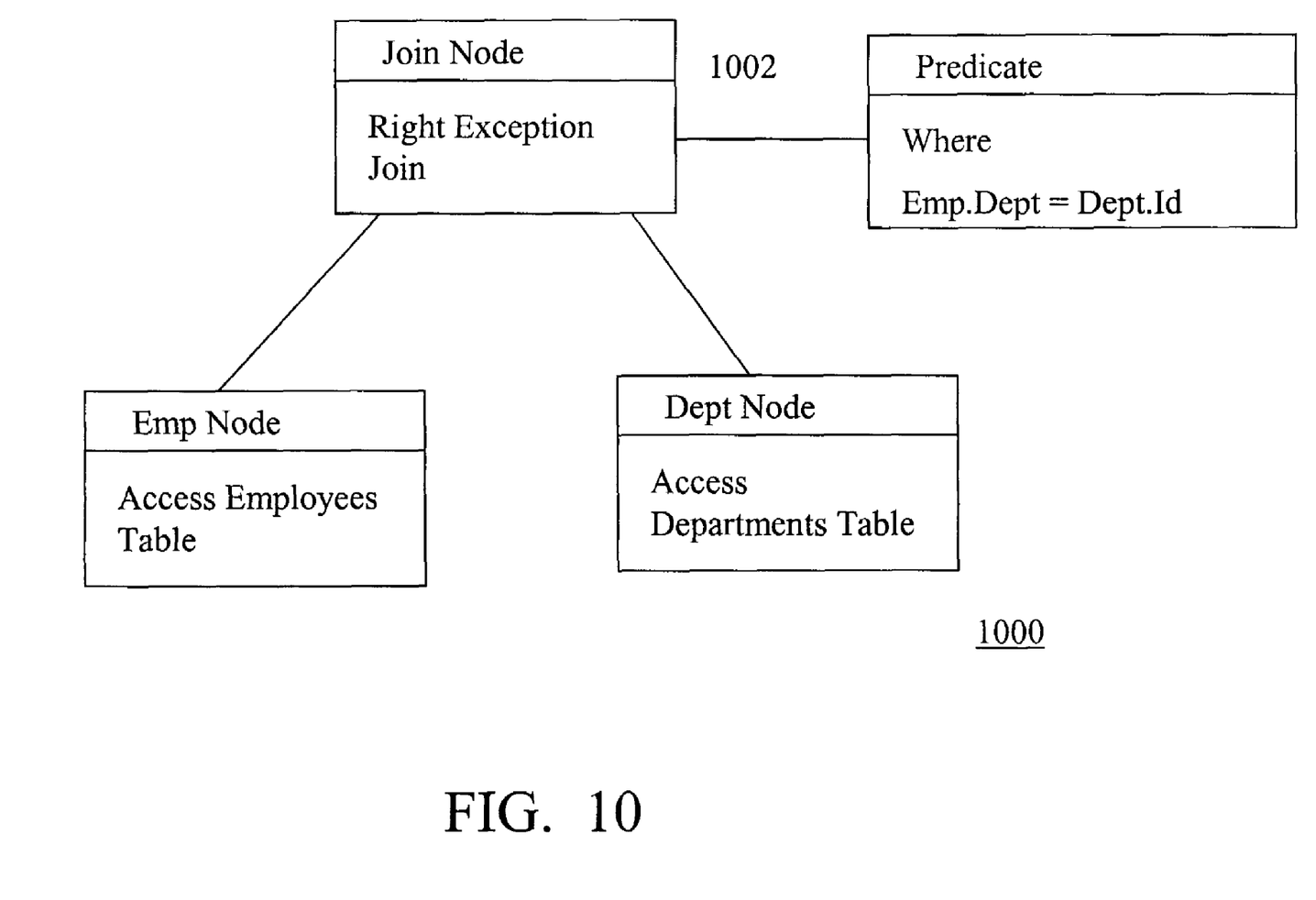
FIG. 10 illustrates a conventional tree-graph representation of a Right Exception Join.
Figure 11:
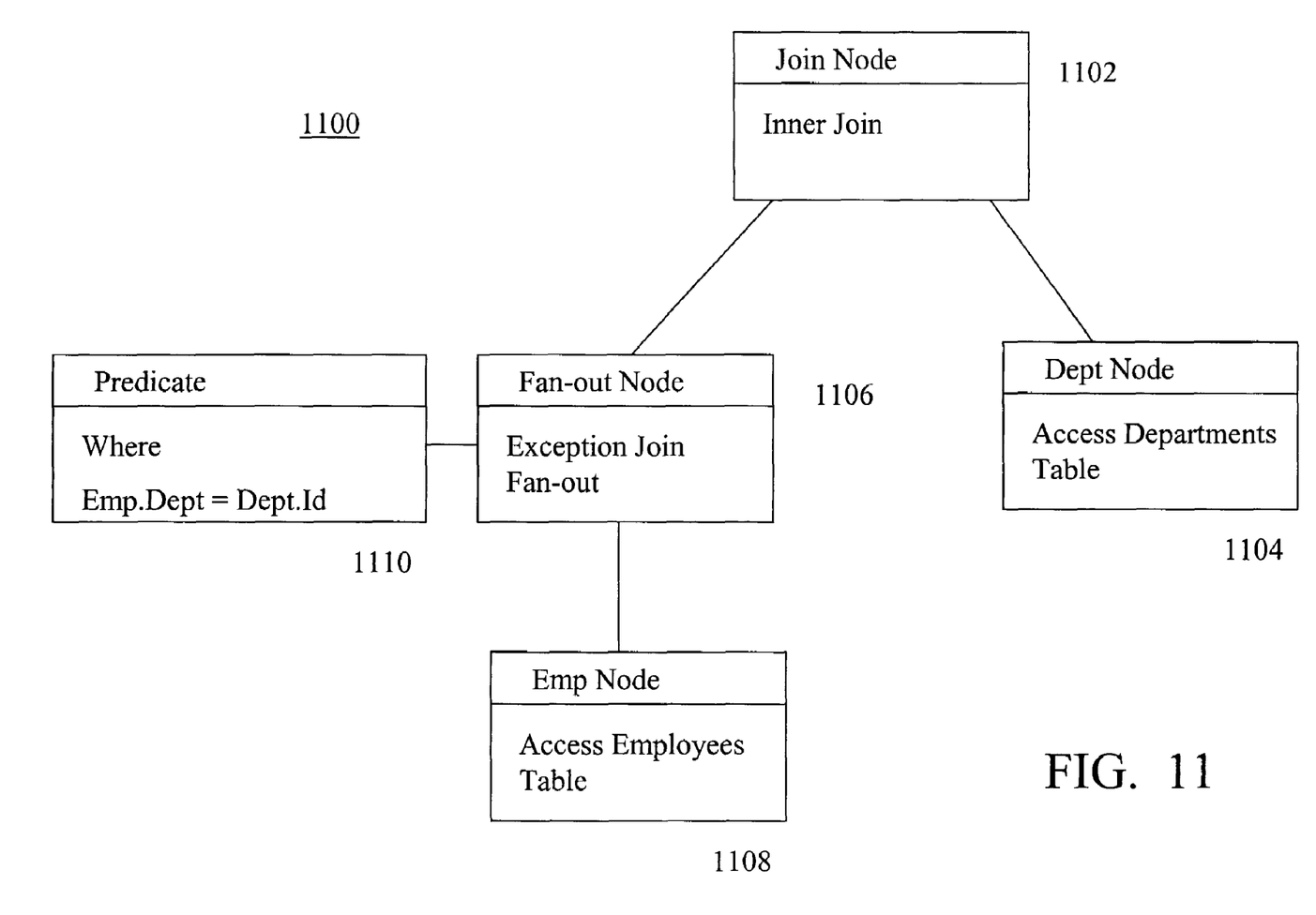
FIG. 11 illustrates a restructured tree-graph according to exemplary embodiments of the present invention that is functionally equivalent to a Right Exception Join.

FIG. 10 illustrates a conventional query graph 1000 for a Right Exception Join and FIG. 11 illustrates a restructured query graph 1100 in which the Right Exception Join node 1002 has been replaced with an Inner Join 1102 and an Exception Fan-out node 1106 and the predicate moved so as to be associated with the Fan-out node 906. A query executing according to this plan 1100 on the above exemplary tables would return only one record, that of "Siberia" because it is a record from the Dept table that has a Dept.Id value not matched in the Emp table.

One of ordinary skill will recognize that a tree graph, with parent and child nodes, is merely a logical representation of a query plan that aids in understanding how a database engine will execute a particular query. However, the query plan generated by the optimizer will usually comprise proprietary code understandable and executable by the database engine. This code does not specifically require parent nodes and child nodes but, instead, includes logic that is easily represented by a tree graph model having such nodes and connections and can be represented by other types of data structures as well. Accordingly, while embodiments of the present invention are more easily understood by referring to tree graph terminology, and, thus, have been described herein using such terminology, these embodiments do not require actual creation and modification of a tree graph. Instead, the embodiments of the present invention avoid query plan code that would implement an Outer or Exception Join by substituting query plan code that implements an Inner Join and Fan-Out node appropriately arranged.

Various modifications may be made to the illustrated embodiments without departing from the spirit and scope of the invention. Therefore, the invention lies in the claims hereinafter appended.

What is claimed is:

1. A computer implemented method for optimizing a database query plan, comprising the steps of:
    identifying a parent node that is a Join node, wherein said parent node has an original first child node and an original second child node, and wherein the parent node comprises a Join node that is selected from the group consisting of a Left Join node, a Right Join node, a Left Exception Join node and a Right Exception Join node;
    changing said parent node to an Inner Join node;
    substituting a new node as a first child node of the Inner Join node; and
    moving the original first child node to be a child node of the new node.

2. The method according to claim 1, wherein the parent node comprises a Left Join node.

3. The method according to claim 2, wherein the new node comprises an Outer Join Fan-out node, the original first child node represents a first table having a first plurality of records, and the original second child node represents a second table having a second plurality of records.

4. The method according to claim 3, wherein when the query plan is executed, the new node is configured to return, for each record of the second plurality of records, one or more matching records from the first plurality of records according to a set of criteria.

5. The method according to claim 4, wherein the new node is further configured to return, for any record of the second plurality of records for which no matching records exist, a NULL record.

6. The method according to claim 1, wherein the parent node comprises a Left Exception Join.

7. The method according to claim 6, wherein the new node comprises an Exception Fan-out node, the original first child node represents a first table having a first plurality of records, and the original second child node represents a second table having a second plurality of records.

8. The method according to claim 7, wherein when the query plan is executed, the new node is configured to not return any records, for each record of the second plurality of records having one or more matching records from the first plurality of records according to a set of criteria.

9. The method according to claim 8, wherein the new node is further configured to return, for any record of the second plurality of records for which no matching records exist, a NULL record.

10. The method according to claim 1, wherein the parent node comprises a Right Join.

11. The method according to claim 10, wherein the new node comprises an Outer Join Fan-out node, the original first child node represents a first table having a first plurality of records, and the original second child node represents a second table having a second plurality of records.

12. The method according to claim 11, wherein when the query plan is executed, the new node is configured to return, for each record of the second plurality of records, one or more matching records from the first plurality of records according to a set of criteria.

13. The method according to claim 12, wherein the new node is further configured to return, for any record of the second plurality of records for which no matching records exist, a NULL record.

14. The method according to claim 1, wherein the parent node is a Right Exception Join.

15. The method according to claim 14, wherein the new node comprises an Exception Fan-out node, the original first child node represents a first table having a first plurality of records, and the original second child node represents a second table having a second plurality of records.

16. The method according to claim 15, wherein when the query plan is executed, the new node is configured to not return any records, for each record of the second plurality of records having one or more matching records from the first plurality of records according to a set of criteria.

17. The method according to claim 16, wherein the new node is further configured to return, for any record of the second plurality of records for which no matching records exist, a NULL record.

18. An apparatus comprising:
at least one processor;
a memory coupled with the at least one processor; and
an optimizer residing in the memory and executed by the at least one processor, the optimizer configured to identify a Join node in a query plan that interferes with optimization and replace the Join node with an Inner Join node and a new node, wherein the Join node is selected from the group consisting of a left Join node, a Right Join node, a Left Join node and a Right Exception Join node.

19. The apparatus according to claim 18, wherein the Join node is one of a Left Join and a Left Exception Join.

20. The apparatus according to claim 18, wherein the Join node is one of a Right Join and a Right Exception Join.

21. A program product, comprising:
program code configured upon execution to perform the steps of:
identifying a parent node that is a Join node, wherein said parent node has an original first child node and an original second child node
changing said parent node to an Inner Join node;
substituting a new node as a first child node of the Inner Join node; and
moving the original first child node to be a child node of the new node; and
a physical computer readable storage medium storing the program code.

22. The program product according to claim 21 wherein the parent node is one of a Left Join node and a Left Exception Join node.

23. The program product according to claim 21, wherein the parent node is one of a Right Join node and a Right Exception Join node.

24. A method performed by a computer executing program code resident on a computer-readable storage medium for creating at least a portion of a query plan for a Join of a first table and a second table, the method comprising the steps of:
generating Inner Join logic for the query plan, wherein the Inner Join logic joins the first table and a Fan-out node;
generating Fan-out node logic for the query plan, wherein the Fan-out node logic accesses the second table according to a set of selection criteria; and
executing the query plan.

25. The method of claim 24, wherein the step of generating Inner Join logic includes the steps of:
generating an Inner Join parent node;
generating a first child node of the Inner Join parent node, said first child node comprising the first table; and
generating a second child node of the Inner Join parent node, said second child node comprising the Fan-out node.

26. The method according to claim 25, wherein the Join is one of a Left Join, Right Join, Left Exception Join, and Right Exception Join.

27. The method according to claim 25, wherein the step of generating Inner Join logic includes the steps of:
identifying a parent node that is the Join, wherein said parent node has an original first child node representing the first table and an original second child node representing the second table;
changing said parent node to an Inner Join node; and substituting the Fan-out node as a first child node of the Inner Join node.

28. The method according to claim 27, wherein when the query plan is executed, the Fan-out node is configured to return:
   a) for each record in the first table, one or more matching records from the second table according to the set of selection criteria, and
   b) for any record of the first table for which no matching records exist, a NULL record.

29. The method according to claim 27, wherein when the query plan is executed, the Fan-out node is configured to:
   a) not return any records, for each record in the first table, having one or more matching records from the second table according to the set of selection criteria, and
   b) for any record of the first table for which no matching records exist, a NULL record.

* * * * *